(12) United States Patent
Al-Mehthel et al.

(10) Patent No.: US 9,346,956 B2
(45) Date of Patent: May 24, 2016

(54) FOAMED SULFUR ASPHALTS FOR PAVEMENT RECYCLING AND SOIL STABILIZATION

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Saleh H. Al-Idi, Dhahran (SA); Hamad I. Al-Abdul Wahhab, Dhahran (SA); Ibnelwaleed A. Hussein, Dhahran (SA)

(73) Assignee: Saudi Arabian Oil Company (SA)

( * ) Notice: Subject to any disclaimer, the term of this patent is extended or adjusted under 35 U.S.C. 154(b) by 181 days.

(21) Appl. No.: 14/101,857

(22) Filed: Dec. 10, 2013

(65) Prior Publication Data
US 2015/0159018 A1  Jun. 11, 2015

(51) Int. Cl.
| | |
|---|---|
| *C08L 95/00* | (2006.01) |
| *C08J 9/12* | (2006.01) |
| *C08K 3/06* | (2006.01) |
| *C08K 3/22* | (2006.01) |

(52) U.S. Cl.
CPC .. *C08L 95/00* (2013.01); *C08J 9/12* (2013.01); *C08K 3/06* (2013.01); *C08K 3/22* (2013.01); *C08J 2395/00* (2013.01); *C08L 2555/24* (2013.01); *C08L 2555/52* (2013.01)

(58) Field of Classification Search
CPC ........ C08L 95/00; C09D 195/00; C10C 3/00; D06N 5/00; C04B 26/26
See application file for complete search history.

(56) References Cited

U.S. PATENT DOCUMENTS

| | | | | |
|---|---|---|---|---|
| 4,692,350 | A | * | 9/1987 | Clarke .................. E01C 19/176 106/122 |
| 5,670,567 | A | * | 9/1997 | Lahalih ................ C08K 3/0008 524/404 |

(Continued)

FOREIGN PATENT DOCUMENTS

| | | |
|---|---|---|
| EP | 1 398 351 A1 | 3/2004 |
| GB | 1 325 916 A | 8/1973 |
| WO | 2010/017283 A2 | 2/2010 |

OTHER PUBLICATIONS

Pencheng Fu, John T. Harvey, David Jones, and You-Chen Chao. "Understanding Internal Structure Characteristics of Foamed Asphalt Mixes with Fracture Face Image Analyses". 2008. DOI: 10.3141/2057-03.*

(Continued)

*Primary Examiner* — Pegah Parvini
*Assistant Examiner* — Alexandra M Moore
(74) *Attorney, Agent, or Firm* — Bracewell LLP; Constance Gall Rhebergen; Linda L. Morgan

(57) ABSTRACT

Methods for manufacturing a foamed sulfur asphalt stabilized soil and a foamed sulfur asphalt are provided. The foamed sulfur asphalt stabilized soil includes an foamed sulfur asphalt, an air-dried aggregate, moisturizing water, and Portland cement. The foamed sulfur asphalt includes an asphalt binder, elemental sulfur, foaming air, and foaming water. The foamed sulfur asphalt has a foam half-life equal to or greater than about 6 seconds and a foam expansion ratio equal to or greater than 8. The foamed sulfur asphalt also has an amount of elemental sulfur in a range of from about 10% to about 50% by weight of the combined amounts of elemental sulfur and the asphalt binder in the foamed sulfur asphalt.

20 Claims, 5 Drawing Sheets

(56) References Cited

U.S. PATENT DOCUMENTS

| | | | | |
|---|---|---|---|---|
| 6,627,680 | B2 * | 9/2003 | Zakiewicz | C01B 17/0237 423/524 |
| 2005/0127550 | A1 * | 6/2005 | De Bruyn | C09K 17/28 264/109 |
| 2011/0041729 | A1 * | 2/2011 | Colange | C04B 26/26 106/270 |
| 2013/0276668 | A1 * | 10/2013 | Ranka | C08L 95/005 106/122 |

OTHER PUBLICATIONS

PCT International Search Report and the Written Opinion; dated Apr. 15, 2015; International Application No. PCT/US2014/067872; International File Date: Dec. 1, 2014.

Al-Mehthel, M., et al.; Sulfur Extended Asphalt as a Major Outlet for Sulfur that Outperformed Other Asphalt Mixes in the Gulf; The Sulphur Institutes (TSI) Sulphur World Symposium, Apr. 12-15, 2010; Doha, Qatar; pp. 1-16; XP-002737924.

Asi, I.M.; Stabilization of Sebkha Soil Using Foamed Asphalt; ASCE—Journal of Materials in Civil Engineering; Oct. 1, 2001; pp. 325-331; vol. 13 No. 5; Journal of Materials in Civil Engineering; XP-055180061.

Asi, I.M., et al.; Stabilization of Dune Sand Using Foamed Asphalt; ASTM Geotechnical Testing Journal; Jun. 1, 2002; pp. 168-176; vol. 25 No. 2; XP-055180062.

"Foamed bitumen mix design procedure using the Wirtgen WLB 10" 21 pgs.

Al-Abdul Wahhab et al. "Evaluation of foam aspahlt technology for road base construction in the Gulf" Efficient Transportation and Pavement Systems, Taylor & Francis Group, London, UK, 2009, pp. 571-583.

Al-Abdul Wahhab et al. "Study of road bases construction in Saudi Arabia using foam asphalt" Construction and Building Materials, vol. 26, 2012, pp. 113-121.

Asi "Performance evaluation of Superpave and Marshall asphalt mix designs to suite Jordan climatic and traffic conditions" Construction and Building Materials, vol. 21, 2007, pp. 1732-1740.

Menthel "Recycler WR 2500: The outstanding features and wealth of applications" Wirtgen GmbH, 5 pgs.

Wirtgen Cold Recycling Manual, Wirtgen GmbH, 2nd edition, Nov. 2004, 14 pgs.

* cited by examiner

FOAMED SULFUR ASPHALTS FOR PAVEMENT RECYCLING AND SOIL STABILIZATION

BACKGROUND OF THE INVENTION

1. Field of the Invention

The field of invention relates to foamed sulfur asphalts, foamed sulfur asphalt stabilized soils, and methods of formation.

2. Description of the Related Art

During the manufacturing and processing of materials containing asphalt, including asphalt-coated aggregate (asphalt cement), hot asphalt mixes, and foamed asphalt, working temperatures above about 150° C. (about 300° F.) can cause problems for workers and equipment. The sulfur and sulfur compounds present in asphalt, including elemental sulfur and naturally present heterorganic compounds, typically begin to react with other constituents in the asphalt and with the air at temperature above about 150° C. Sulfur forms hydrogen sulfide (H2S) gas, which is toxic to humans, starting at about 151° C. (about 305° F.). Free sulfur in a hydrocarbon environment, including asphalt, dehydrogenates the hydrocarbons present and forms hydrogen sulfide. Heating sulfur to high temperatures in the presence of oxygen forms sulfur dioxide, which is noxious to humans and is an air pollutant.

Sulfur is an abundant and inexpensive material. Elemental sulfur is a byproduct of non-sweet natural gas and petroleum processing. Sources of "free" sulfur include petroleum refineries and gas sweetening plants. Because of the quantity of sulfur extracted from natural gas and petroleum, many sulfur producers consider elemental sulfur a waste product.

It is desirable to find commercial uses for elemental sulfur that can dispose of it in a safe and effective manner. Incorporating sulfur into commercial products can transform what many consider a potential "waste" product into a product with practical value.

SUMMARY OF THE INVENTION

A method of manufacturing a foamed sulfur asphalt stabilized soil includes introducing an asphalt binder, elemental sulfur, foaming air, and foaming water into a foaming mixer. The foaming water has a greater pressure than the foaming air. The method includes the step of operating the foaming mixer such that a foamed sulfur asphalt forms. The foamed sulfur asphalt has a foam half-life equal to or greater than about 6 seconds and has a foam expansion ratio equal to or greater than 8. The foaming mixer operates at a temperature of no greater than about 150° C. The method includes the step of introducing the foamed sulfur asphalt, an aggregate having a moisture content, and Portland cement into an aggregate mixer. The method includes the step of operating the aggregate mixer such that the foamed sulfur asphalt stabilized soil forms.

A foamed sulfur asphalt stabilized soil includes the foamed sulfur asphalt, the air-dried aggregate, moisturizing water, and Portland cement. The foamed sulfur asphalt has the foam half-life equal to or greater than about 6 seconds and has the foam expansion ratio equal to or greater than 8.

A method of manufacturing a foamed sulfur asphalt includes introducing the asphalt binder, elemental sulfur, foaming air, and foaming water into the foaming mixer. The foaming water has a greater pressure than the foaming air. The method includes the step of operating the foaming mixer such that a foamed sulfur asphalt forms. The foamed sulfur asphalt has a foam half-life equal to or greater than about 6 seconds and has a foam expansion ratio equal to or greater than 8. The foaming mixer operates at a temperature of no greater than about 150° C.

A foamed sulfur asphalt includes the asphalt binder, elemental sulfur, foaming air, and foaming water. The foamed sulfur asphalt has the foam half-life equal to or greater than about 6 seconds and the foam expansion ratio equal to or greater than 8. The foamed sulfur asphalt also has an amount of elemental sulfur in a range of from about 10% to about 50% by weight of the combined amounts of elemental sulfur and the asphalt binder in the foamed sulfur asphalt.

The foamed sulfur asphalt (FSA) and the foamed sulfur asphalt stabilized soil (FSASS) are new avenues for consuming elemental sulfur, which is a by-product of hydrocarbon production. The use of free sulfur also acts to expand the asphalt supply by acting as a filler. Elemental sulfur has also been found to surprisingly enhance the properties of the foamed asphalt stabilized soil compositions. The addition of sulfur to the foamed asphalt composition increases the service life of the produced FSASS. The addition of sulfur to the foamed asphalt composition also lowers the manufacturing temperature of the foamed asphalt product, which saves energy, while not producing harmful or toxic sulfur gases like hydrogen sulfide or sulfur oxides.

The foamed sulfur asphalt and the foamed sulfur asphalt stabilized soil can be utilized by the construction industry worldwide as an alternative to regular foamed asphalt for soil stabilization and pavement recycling. The FSASS can be made using cold recycling techniques. Roads aggregate bases, subbases and reclaimed asphalt (that is, previously applied) pavement' mixes are useful aggregates to form foamed sulfur asphalt stabilized soils. The FSA is also useful to stabilize various soil types, including sand, marl, and sabkha soils, to form the FSASS. For purposes of this application, "soil" and "aggregate" are interchangeable terms. Several common physical properties of stabilized soils are either comparable to or are superior when stabilized with FSA versus regular foamed asphalt.

Use of the foamed sulfur asphalt provides several benefits. FSA can be produced at 150° C., whereas it was found that regular foamed asphalt cannot be produced at a temperature less than 180° C. while still meeting foam expansion and half-life requirements. This provides not only energy savings (running processing equipment at lower temperatures) but also prevents the emission of hydrogen sulfide and sulfur oxides from the sulfur naturally present in the bitumen as well as the added sulfur.

The foamed sulfur asphalt stabilized soil products have several desirable properties over traditional foamed asphalt stabilized soils. Besides acting as a useful repository for "waste" sulfur, the inclusion of sulfur also surprisingly imparts useful physical properties in certain foamed sulfur asphalt/soil combinations. A reduction in permanent deformation occurs in both combinations of FSA with marl soil and with sabkha soil. Based upon these results, it is believed that dune sand can also be blended with sabkha or marl soils and the foamed sulfur asphalt to improve its rutting resistance, which will expand the types and availability of aggregate in desert environments for road and site construction. Also surprisingly, durability ("stability loss"), improved for all FSASS over their foamed regular asphalt stabilized soil counterparts. In addition, the soil stabilized with foamed sulfur asphalt surprisingly has a higher rutting resistance compared to the same soil treated with conventional foamed asphalt.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

DETAILED DESCRIPTION OF THE PREFERRED EMBODIMENTS

Figure 1:
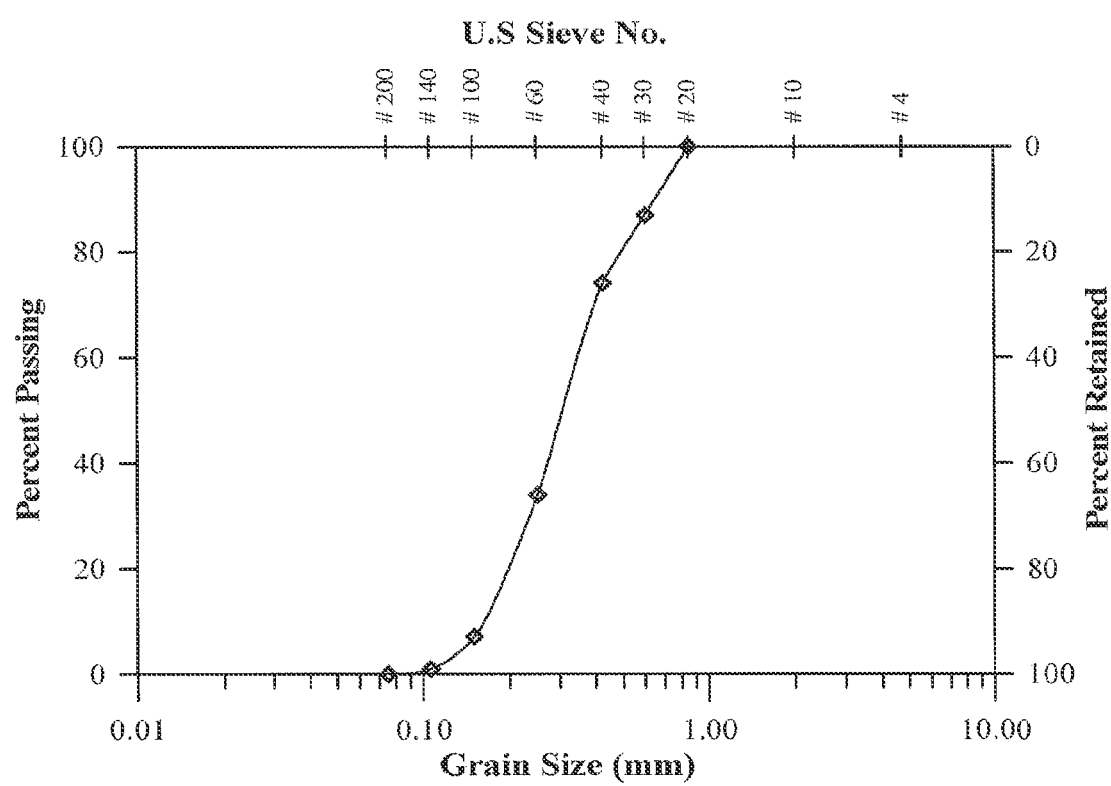
FIG. 1 is a chart showing the gradation curve for the untreated dune sand used for forming example and comparative example foamed asphalt stabilized soils.

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. AU technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided, in the Specification or in the appended. Claims, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure:

Foamed Sulfur Asphalt

The foamed sulfur asphalt includes an asphalt binder. Bitumen or asphalts that are useful can originate from petroleum distillation (for example, vacuum tails); coal, tar sands or oil shale processing; or from naturally occurring sources (for example, Trinidad Lakes). The neat asphalt (that is, without added free sulfur or other additives) can be a singular material or a blend of several base asphalts. All types of asphalt binders are useful for making foamed sulfur asphalts, including "Performance Grade" asphalts; however, emulsified and cutback asphalts cannot be used because they cannot be foamed. "Performance Graded" asphalt binders are based upon the properties listed in the Performance Grade table ("Table 1") of the AASHTO Performance Graded Asphalt Binder Specification M 320. An embodiment of the foamed sulfur asphalt comprises a Performance Graded 64-10 (PG 64-10) asphalt binder.

The foamed sulfur asphalt includes elemental sulfur. Elemental or "free" sulfur includes not only singular sulfur atoms but also sulfur in complexes and covalently bonded to other sulfur atoms, including $\alpha$-sulfur (orthorhombic sulfur), $\beta$-sulfur (monoclinic sulfur) and "catena" sulfur. Chains or rings of sulfur atoms can range from a few sulfur atoms to hundreds of covalently linked sulfur atoms. All allotropes of elemental sulfur are suitable for use in the sulfur-extended composition. Sulfur covalently bonded with non-sulfur atoms, such as carbon, hydrogen or other atomic species, including heterorganic compounds, is not considered "free" or elemental sulfur. Because of the wide variety of allotropes, elemental sulfur is found in many different solid and liquid forms and can change between forms based upon modifications to its environment, including heating and pressure. Depending on the molecular configuration of the free sulfur, the melting point of sulfur varies between about 115° C. and about 140° C. Typically, however, it is handled in either a pellet or powdered solid form or in a molten liquid form.

The foamed sulfur asphalt has a foam expansion ratio equal to or greater than 8. The foam expansion ratio is the ratio of expanded volume of the foamed asphalt compared to the volume of foamed asphalt discharged from the foaming mixer.

The foamed sulfur asphalt has a foam half-life equal to or greater than about 6 seconds. Foam half-life is determined as the period between the point of peak expansion and the point where the foamed asphalt collapses to half its peak expansion volume.

Forming the Foamed Sulfur Asphalt

The method of manufacturing the foamed sulfur asphalt includes the steps of introducing the free sulfur and the asphalt binder into the foaming mixer. The introduction of the free sulfur and the asphalt binder can be separate or can be as a combined material, that is, as a sulfur asphalt hinder. An embodiment of the method includes introducing the free sulfur and the asphalt binder into the foaming mixer as a sulfur asphalt binder. The amount of elemental sulfur in a range of from about 10% to about 50% by weight of the combined amounts of elemental sulfur and the asphalt binder. An embodiment of the method includes where the introduced sulfur asphalt binder comprises about 30 wt. % free sulfur and about 70 wt. % neat asphalt binder by weight of the sulfur asphalt binder. The sulfur asphalt binder can be blended on-site or previously formed. An embodiment of the method includes the steps of introducing free sulfur and the asphalt binder to a pre-mixer such that the sulfur asphalt binder forms, and then introducing the sulfur asphalt binder into the foaming mixer in place of the separately-introduced asphalt binder and elemental sulfur.

Regardless of the method introduction of the free sulfur into the foaming mixer—as part of a pre-formed sulfur asphalt binder or separately—an embodiment of such free sulfur introduction methods includes introducing the free sulfur as a molten liquid. Molten sulfur can mix with the neat asphalt in a low-sheer environment to form the sulfur asphalt binder, which is then introduced into the foaming mixer, or directly into the foaming mixer. For example, for a cold recycling operation, the neat asphalt and the free sulfur are maintained in separate vessels at a temperature where both are molten. The molten free sulfur and the molten neat asphalt are introduced to one another in a binder mixer to form the sulfur asphalt binder just before the Sulfur asphalt binder is introduced into the foaming mixer. An embodiment of such free sulfur introduction methods includes introducing the free sulfur as a solid. The solid elemental sulfur, as a powder or a pellet, is introduced into and blended with a molten neat asphalt, usually under high sheer, to fully incorporate the sulfur into the asphalt. The asphalt can be maintained at a temperature below, at or above the melting temperature of sulfur, but higher temperatures are known to aid incorporation.

Figure 6:
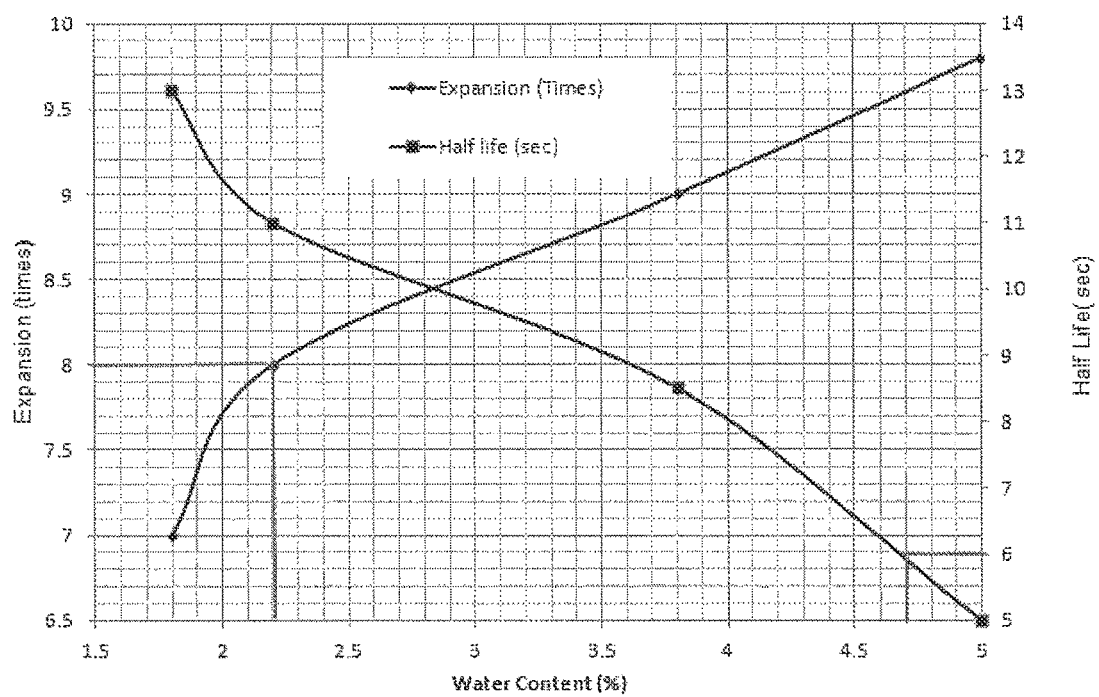
FIG. 6 is a chart showing the expansion ratio and half-life at 150° C. for a 30/70 weight percent sulfur asphalt binder used for forming example foamed sulfur asphalt stabilized soils.

The method of manufacturing the foamed sulfur asphalt includes the step of introducing the foaming water into the foaming mixer. An embodiment of the method includes introducing the foaming water such that the foamed sulfur asphalt has a water content in a range of from about 2.3% to about 4.7% by weight. An embodiment of the foamed sulfur asphalt includes where the foamed sulfur asphalt has a water content in a range of from about 2.3% to about 4.7% by weight. Altering the proportion of water that is introduced to the asphalt manipulates the expansion ratio and the half-life of the produced foamed asphalt composition. The amount of introduced foaming water is varied and the expansion ratio and half-life determined at several foamed sulfur asphalt moisture content values at 150° C. using a 30/70 wt. % sulfur asphalt binder as shown in FIG. 6. The water content for the foamed sulfur asphalt is selected to provide the minimum expansion ratio of 8 times and minimum half-life of 6 seconds. According to FIG. 6, the 30/70 wt. % foamed sulfur asphalt binder meets the expansion factor and the half-life requirements with a water content in a range of from about 2.3% to about 4.7% by weight.

The foaming mixer operates at a temperature in a range of from about 140° C. to about 150° C. It is not recommended operating the foaming mixer at temperatures above 150° C. due to the potential evolution of flammable gases from the combination of sulfur and asphalt (for example, hydrogen sulfide) in the presence of the foaming air, which is pressurized, and for toxic/noxious gas evolution.

Forming the Foamed Sulfur Asphalt Stabilized Soil

The method of manufacturing the foamed sulfur asphalt stabilized soil includes the step of introducing the aggregate, which has a moisture content, into the aggregate mixer. In an embodiment of the method of manufacturing foamed sulfur asphalt stabilized soil, the aggregate can be pre-mixed with an amount of water. In one embodiment, the amount of water is suitable such that the moisture content of the aggregate after pre-mixing is about the optimum moisture content for compaction of the aggregate. In another embodiment, the method includes the step of introducing moisturizing water to the aggregate such that the combination forms an aggregate having a moisture content of about the optimum moisture content for compaction of the aggregate. In another embodiment, the method includes the step of introducing moisturizing water such that the combination of the moisturizing water and the introduced aggregate forms an aggregate having a moisture content of about $0.5(W_{OMC})+1$, where $W_{OMC}$ is a determined optimum moisture content for introduced aggregate in weight percent. For such embodiments, the moisture content of the introduced aggregate in weight percent of the aggregate as air-dried aggregate is in a range of from about the moisture content of air-dried aggregate to less than about the optimum moisture content for compaction of the aggregate.

The foamed sulfur asphalt passes from the foaming mixer and introduced to the aggregate at a temperature no greater than 130° C.

An embodiment of the method of manufacturing foamed sulfur asphalt stabilized soil includes introducing an amount of Portland cement in a range of from about 0.1 wt. % to about 2 wt. % of the weight of the aggregate on an air-dried basis. Portland cement adds a certain amount of adhesive qualities to fine aggregates such as soil and sand.

Example

Examples of specific embodiments facilitate a better understanding of using the foamed sulfur asphalt and the foamed sulfur asphalt stabilized soil. In no way should the Examples limit or define the scope of the invention.

Three predominant soil types from Eastern Saudi Arabia are used in conjunction with two different types of foamed asphalt compositions—a foamed sulfur asphalt (example) and a foamed asphalt (comparative example)—to form a series of experimental stabilized soil samples for comparative physical testing of the influence of sulfur addition to the foamed asphalt.

Mixing Device

A mixing device forms both the example and comparative example foamed asphalt compositions. The laboratory scale foamed asphalt plant WLB 10 with mixer (Wirtgen Group; Germany), which closely simulates full-scale production of foamed asphalts, is used in the experiments.

The WLB 10 with mixer includes an insulated kettle with temperature control to heat and maintain the asphalt binder. The mixing device also includes a calibrated distribution system for introducing the asphalt binder, water and air to one another to form the foamed asphalt composition. The mixing device injects predetermined volumes of the asphalt binder, water and air into a foaming mixer to form the foamed asphalt compositions. The foaming mixer, which is an expansion chamber, is temperature-regulated. The foamed asphalt composition forms in a closed system. Fumes from the evolution of potentially harmful or toxic sulfur gases are not released into the environment or to operators of the mixing device.

For the experiment, the air flow gauge of the WLB 10 is calibrated for an air introduction pressure of about 5 bars and at ambient temperature. The air introduction pressure can be in a range of from about 5 bars to about 9 bars. For the experiment, the water flow gauge is calibrated for a water introduction pressure of about 6 bars and at ambient temperature. The foaming water introduction pressure is maintained at least 1 bar higher in pressure than the foaming air pressure to avoid air intrusion. Potable water is useful as the introduced water. The asphalt binder flow rate is maintained by manipulating the introduction temperature of the asphalt binder.

The foamed asphalt composition discharges from the foaming mixer through a foamed asphalt nozzle. A fixed amount of foamed asphalt compositions discharges directly into a sample of aggregate in a laboratory aggregate mixing container. The laboratory mixer agitates the combination of the aggregate and the foamed asphalt composition to form the foamed sulfur asphalt stabilized soil for testing.

Soil Types

Three predominant soil types from Eastern Saudi Arabia that are used for forming the comparative stabilized soil samples are dune sand, sabkha soil, and marl soils. All of the aggregate samples are air-dried before introduction.

Dune Sand

Sand is a widely available and inexpensive resource not only in Saudi Arabia but in many countries around the world. Effective use of sand can be made for road construction if properly stabilized. The gradation curve for samples of the untreated dune sand is shown in FIG. 1. The characteristics of the collected, untreated dune sand are determined by standard aggregate and soil tests and are summarized in Table 1. The optimum moisture content for dime sand is about 0%.

TABLE 1

Several standard aggregate and soil tests results for untreated dune sand.

| Property | Standard Tests | Value |
|---|---|---|
| Sand Equivalent | ASTM D 2419 | 79% |
| Bulk Specific Gravity (Fine) | ASTM C 128 | 2.593 |
| Apparent Specific Gravity (Fine) | ASTM C 128 | 2.661 |
| Water Absorption (Fine) | ASTM C 128 | 0.9% |
| Plasticity Index | AASHTO T-88 | Non-Plastic |

Sabkha Soil

Sabkha soil is collected from Al-Aziziyah sabkha flats. The raw soil includes all the layers above the ground water table but excludes the surface crust. For air drying, the soil is spread on plastic sheets outside the laboratory. Plastic hammers are used to break any crystals and lumps such that the resultant soil passes through an ASTM Sieve No. 4. The screened soil is mixed and preserved in plastic drums until mixing and testing.

Figure 2:
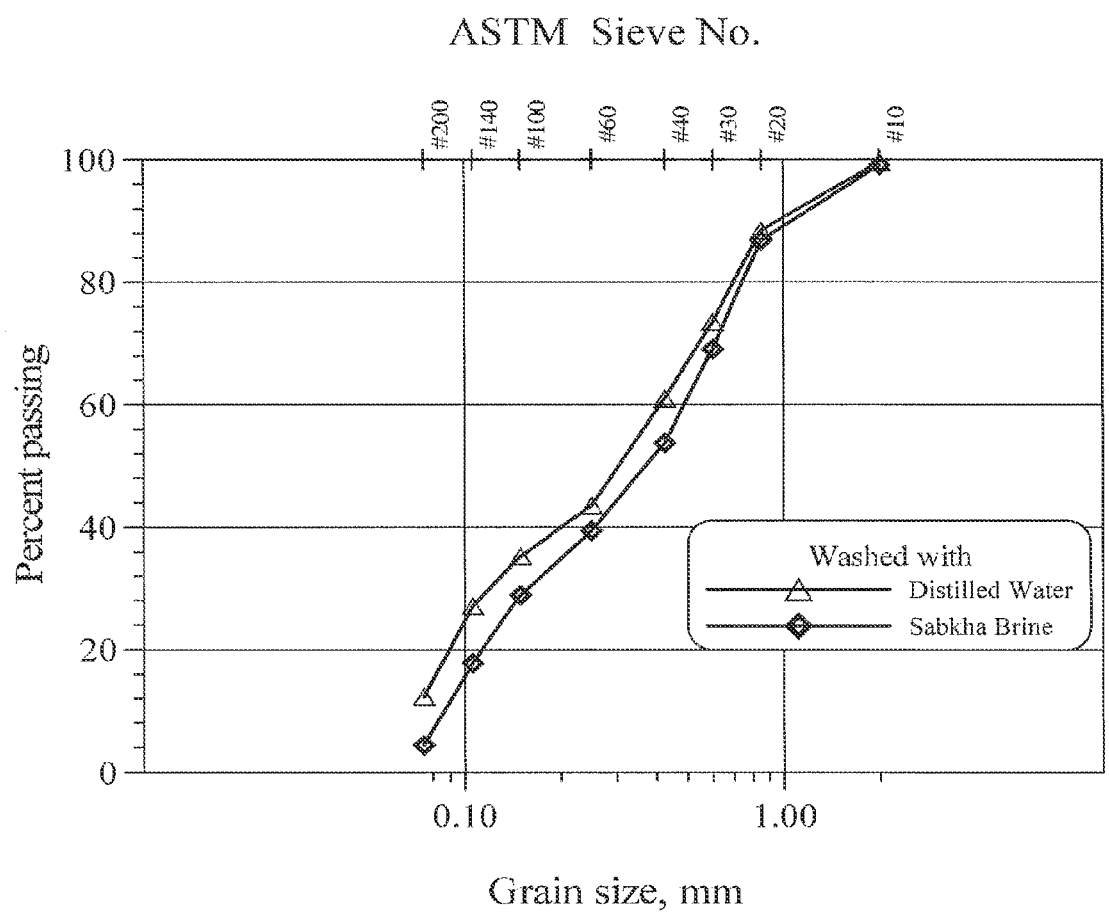
FIG. 2 is a chart showing the grain size distribution curve for Al-Aziziyah sabkha soil used for forming example and comparative example foamed asphalt stabilized soils.

The grain size distribution curve of the sabkha soil is shown in FIG. 2. Two types of wet sieve analyses are performed to characterize the sabkha soil. One test uses distilled water and the other uses a "sabkha brine", or the brine present in the same pit from which the soil is recovered. Both tests, which produced the two curies in FIG. 2, reveal the sandy composition of the sabkha soil. Based on these results, the sabkha soil can be classified as "SP" according to the Unified Soil Classification System (USCS) and as "A-3" according to the AASHTO Classification.

Figure 3:
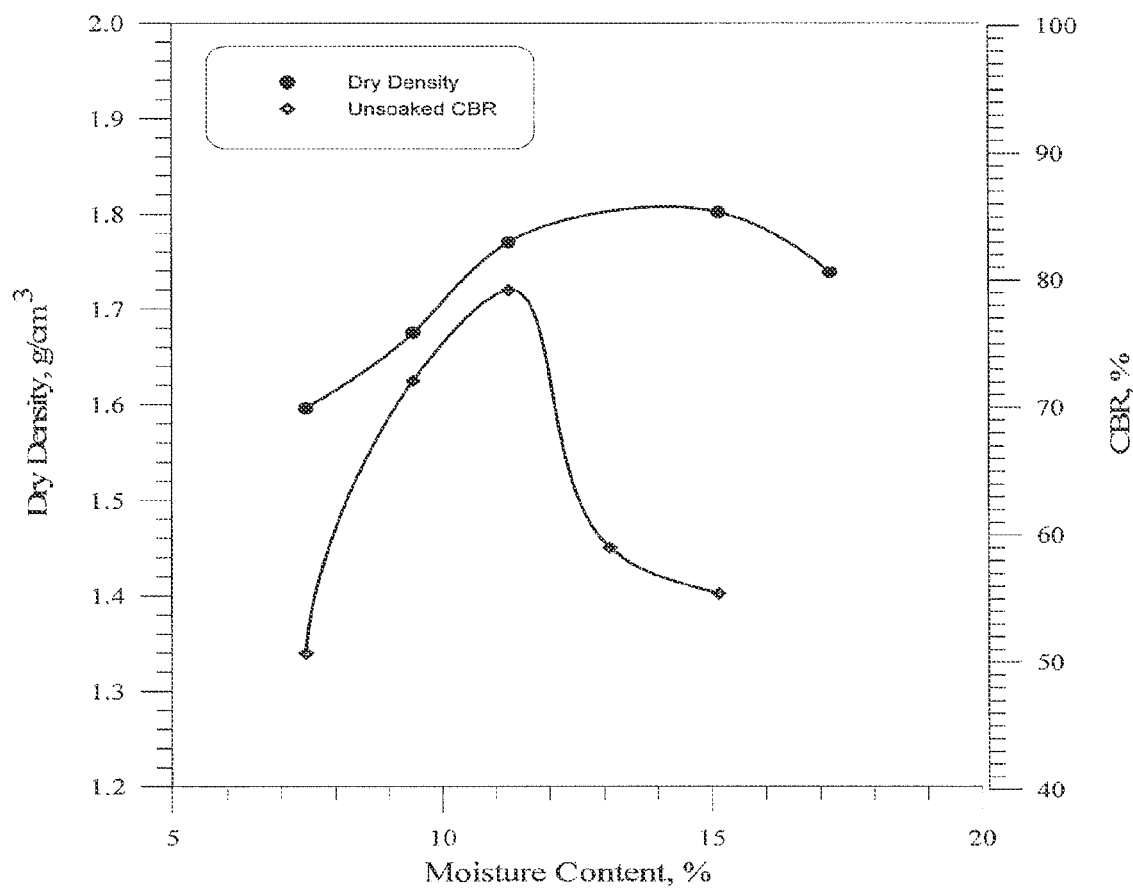
FIG. 3 is a chart showing the effect of moisture content on the dry density and California Bearing Ratio (CBR) of sabkha soil used for forming example and comparative example foamed asphalt stabilized soils.

Testing the sabkha soil uses a modified Proctor compaction test (ASTM D 1557) in order to determine the relationship between the water content of the soil in the mold and the dry density value. The sabkha soil is also tested for the California Bearing Ratio (CBR) (ASTM D 1883). The CBR test results are superimposed on the Proctor compaction test results to determine the relationship of strength behavior of the material with changes in moisture content. The results are presented in FIG. 3. The moisture content (MC) at the optimum unsoaked CBR value, which corresponds to about 95% of the maximum value for dry density, is about 11.5% based on the dry weight of the sabkha soil.

Marl Soil

Figure 4:
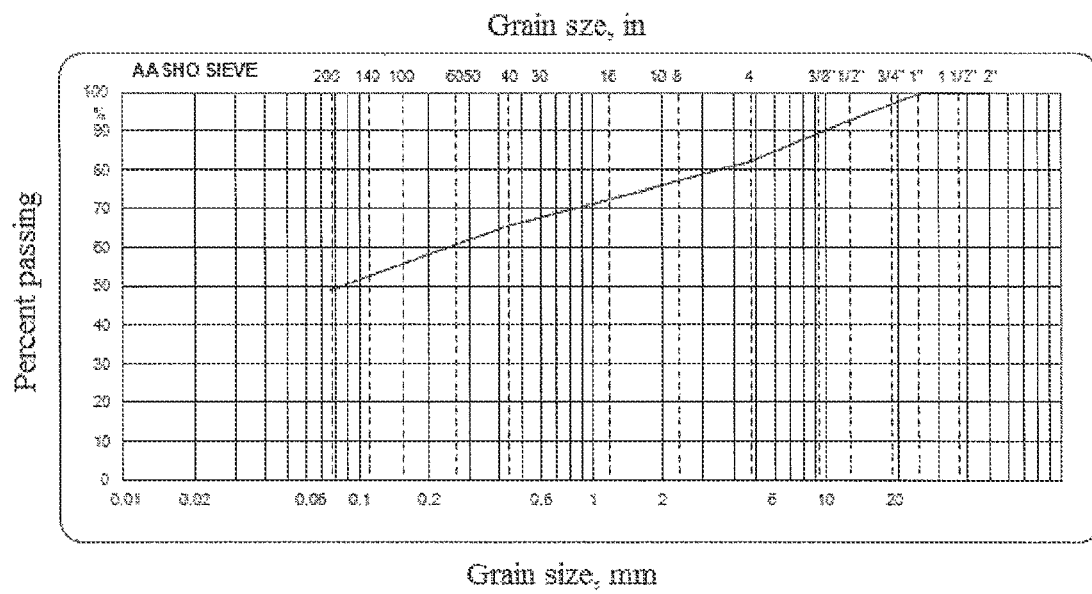
FIG. 4 is a chart showing the grain size distribution curve for grain size distribution curve for marl soil used for forming example and comparative example foamed asphalt stabilized soils.
Figure 5:
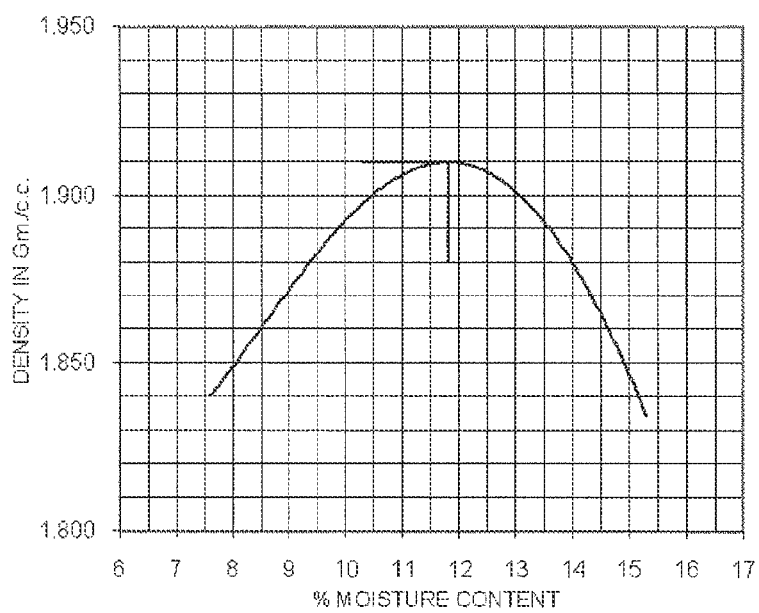
FIG. 5 is a chart showing the effect of moisture content on the dry density of marl soil used for forming example and comparative example foamed asphalt stabilized soils.

FIG. 4 provides the grain size distribution curve for the collected marl soil. The soil grain size is less than 1.0 inches. Half of the soil size passes through a No. 200 sieve. FIG. 5 shows the modified Proctor compaction curve, which indicates that optimum moisture content is about 11.8% based upon the dry weight of the marl soil. The soil has dry CBR of 78 and a soaked CBR of 8. The results given in Table 2 indicates that the amount of sand is low.

TABLE 2

Several standard aggregate and soil tests results for marl soil.

| Test Description | Standard | Test Results |
|---|---|---|
| Sieve Analysis (Gradation) | ASTM D 422 | FIG. 4 |
| Maximum Dry Density (MDD) | ASTM D 1557 | 1910 kg/m³ |
| Optimum Moisture Content (OMC) | ASTM D 1557 | 11.8% |
| Liquid Limit (LL) | ASTM D 4318 | 28 |
| Plasticity Index (PI) | ASTM D 4318 | 10 |
| Unsoaked CBR @ 95% of Max. Dry Density | ASTM C 1883 | 78 |
| Soaked CBR @95% of Max. Dry Density | ASTM C 1883 | 8 |
| Sand Equivalent | ASTM D 2419 | 11% |

Soil Moisture Content

Moisturizing water is introduced to the air-dried soil sample to bring the moisture content of the soil sample close if not to its optimum moisture content (OMC) for compaction before mixing each soil with the example or comparative example foamed asphalt. The amount of moisturizing water introduced to an air-dried soil sample depends on its type and the degree of moisture content in the aggregate. For this experiment, the amount of moisturizing water to introduce is determined using Equation 1:

$$W_{added} = 1 + (0.5 W_{OMC} - W_{air\text{-}dry}),\quad \text{(Eq. 1)}$$

where $W_{added}$ is the moisture content to be added to the air-dried aggregate sample by introducing moisturizing water (in weight percent of the air-dry soil), $W_{OMC}$ is the determined optimum moisture content of the soil sample (in weight percent), and $W_{air\text{-}dry}$ is the determined moisture content of the air-dried soil sample (in weight percent) before water addition. For example, as previously stated the $W_{OMC}$ for dune sand is about 0%, and air-dried dune sand has a moisture content of about 0%; therefore, an amount of moisturizing water that is introduced to the dune sand for receiving the foamed asphalt and then compression is such that the dune sand will have a moisture content of about 1 wt. % by air-dried soil weight. The water addition occurs just before combining the now wetted aggregate with the example and comparative example foamed asphalt compositions.

Portland Cement

In addition to introducing moisturizing water to the soil sample, about 2% by air-dried soil weight worth of Portland cement is introduced and blended with the soil sample. Portland cement is added to enhance curing and strength development. The introduction of the Portland cement occurs before the example or comparative example foamed asphalt is introduced to the soil sample.

Regular Asphalt Binder

The plain, neat or unadulterated asphalt used to form the comparative example foamed asphalt is introduced into the insulated kettle of the WLB 10, and is heated and stirred at a temperature of about 180° C. until utilized for foaming. For this experiment, the regular asphalt is a Performance Graded 64-10 (PG 64-10) asphalt binder.

The temperature is not maintained less than 180° C. for unadulterated asphalt because the foamed plain asphalt is unstable and unable to satisfy the minimum properties of either expansion ratio factor of at least about 8 or the minimum foam half-life of at least about 6 seconds, or both.

Sulfur Asphalt Binder

The sulfur asphalt binder is produced by mixing until homogeneous about 30 wt. % free sulfur and about 70 wt. % plain asphalt (PG 64-10) by total weight of the asphalt sulfur binder. Pre-blended 30/70 wt. % sulfur asphalt (without any other modifying additives) is used as the sulfur asphalt binder for the experiment.

The pre-blended 30/70 wt. % sulfur asphalt binder is formed in an oven at 145° C. and blended together while in a molten state. The molten sulfur asphalt binder is introduced into the insulated kettle of the WLB 10, and is heated to a temperature of about 150° C. and stirred until utilized for foaming.

Foaming Water

The foaming water is introduced to the sulfur asphalt binder such that the foamed sulfur asphalt has a water content of about 3.45% by weight of the sulfur asphalt binder.

Forming Stabilized Soil Examples and Comparative Examples

Marshall mix design for cold mixes is employed to design example or comparative example foamed asphalt stabilized soil mixtures. A total of six stabilized soil mix samples—each with a different amount of example or comparative example foamed asphalt—is made for each soil sample type, which is reported in Table 3.

Amounts of sulfur asphalt binder, foaming water and foaming air are introduced to one another inside the mixer, and the mixer operates such that an example of foamed sulfur asphalt forms in the mixer. With a moisture content of 3.45% by weight of the sulfur asphalt binder, the foam expansion ratio for the foamed sulfur asphalt is about 8.8 times the volume sulfur asphalt discharged and the foam half-life is about 9.1 seconds. Amounts of regular asphalt, foaming water and foaming air are introduced to one another inside the mixer, and the mixer operates such that a comparative example of foamed asphalt forms in the mixer. The temperature inside the mixer is maintained at about 150° C.

The example and comparative example foamed asphalts are produced from the mixer via the foamed asphalt nozzle. The example and comparative example foamed asphalts have a temperature of less than about 130° C., which prevents the evolution of potentially toxic or hazardous sulfur compounds.

To make the soil samples for both the unadulterated and sulfur foamed asphalt stabilized soils, an amount of moisturizing water is introduced to the air-dried soil sample to satisfy the determination made using Equation 1. In addition, about 2% Portland cement by weight of the air-dried aggregate is also introduced and blended for about 30 seconds.

The mixing device is calibrated for discharging a fixed quantity of example or comparative example foamed asphalt per unit time before each soil sample is prepared. The specified volume of the foamed asphalt is discharged directly onto the sample of soil while the soil sample is agitated in a Hobart laboratory mixer. The amount of example or comparative example foamed asphalt introduced to the soil sample is verified by weighing the difference of the mixing bowl content before and after the foamed asphalt addition. The mixing of the combination of the example or the comparative example foamed asphalt and the soil sample occurs for a period in a range of from about 30 seconds to about a minute.

Physical Testing of Stabilized Soil Exempla and Comparative Examples

Stabilized soil examples (comprising foamed sulfur asphalt) and comparative examples (comprising foamed plain asphalt) are made by applying 75 blows of a standard Marshall hammer per face to each stabilized soil sample. Each stabilized soil sample is cured and, if necessary for the test to be performed, soaked in water before testing. The tests performed on each stabilized soil sample include Marshall Stability and Marshall Stability Loss (or Durability) (ASTM D 1559); Indirect Tensile Strength and Optimum Foamed Bitumen Content (ASTM D 4867 and AASHTO T-245); Resilient Modulus (ASTM D 4123); and rutting (permanent deformation). Optimum binder content is the binder content at which the soaked strength is the highest. Durability is determined using similar Marshall Stability samples and the same test procedure but after the samples soaked in water for 24 hours at room temperature. Results are presented in Table 3 for both stabilized soil examples and comparative examples.

Indirect Tensile Strength

Indirect Tensile Strength (ITS) test helps determine mix resistance to cracks development. The ITS test is performed on cylindrical specimens of 2½-inch height by 4-inch diameter (63.5-mm height by 101.6-mm diameter). The test specimens are prepared following the Marshall compaction method. The maximum load the specimen carries carry before failure is the result. The test was carried out at 25° C.

The soaked sample version of the ITS test (samples soaked in water for 24 hours at room temperature) is the primary indicator for the determination of the Optimum Binder Content for each stabilized soil examples.

Resilient Modulus

Resilient Modulus test is an important variable for the mechanistic design approaches of pavement structures. It is the measure of pavement response in terms of dynamic stresses and corresponding resulting strains. Resilient modulus of HMA is conducted by applying diametral pulse loads. The load is applied in the vertical diametrical plane of a cylindrical specimen of 2½-inch height by 4-inch diameter (63.5-mm height by 101.6-mm diameter). The test specimens are prepared according to Marshall compaction method. The resulting horizontal deformation of the specimens is measured and used to calculate resilient modulus. The test was performed at 25° C.

Rutting Test (Permanent Deformation)

The stabilized soil examples and comparative examples are evaluated for rutting resistance using an Asphalt Pavement Analyzer at 30° C., which is a multi-wheeled rig that repeatedly tracks a weighted wheel back and forth across the flat face of a disk-shaped stabilized soil sample. The wheel load is set to 100 $lb_f$ and the wheel pressure is set to 100 psi. A gyratory compactor compacts the six-inch round stabilized soil samples to the same density as the Marshall compaction samples along the flat face of the disk. The wheeled rig crosses at the diameter of each stabilized soil wheel. Before testing, the stabilized soil examples and comparative examples are conditioned at the testing temperature for 4 hours.

TABLE 3

Test results for stabilized dune sand, marl and sabkha soils.

| Soil Type | Test | Asphalt Type | |
|---|---|---|---|
| | | Foamed Sulfur Asphalt | Foamed Asphalt |
| Dune Sand | Optimum Binder Content (% total) | 8 | 7 |
| | Marshall Stability (kN) | 7.8 | 6.8 |
| | Durability (%) | 79 | 75 |
| | Resilient Modulus (MPa) | 950 | 1024 |
| | ITS (kPa) | 85 | 81 |
| | Rutting @ 30° C. (mm) | 12 | 12 |

TABLE 3-continued

Test results for stabilized dune sand, marl and sabkha soils.

| Soil Type | Test | Asphalt Type | |
|---|---|---|---|
| | | Foamed Sulfur Asphalt | Foamed Asphalt |
| Marl | Optimum binder content (% total) | 7 | 7 |
| | Marshall Stability (kN) | 30 | 27.7 |
| | Durability (%) | 72 | 63 |
| | Resilient Modulus (MPa) | 3450 | 4100 |
| | ITS (kPa) | 640 | 532.9 |
| | Rutting @ 30° C. (mm) | 1.27 | 2.6 |
| Sabkha | Optimum binder content (% total) | 7 | 8 |
| | Marshall Stability (kN) | 20 | 20 |
| | Durability (%) | 51 | 48 |
| | Resilient Modulus (MPa) | 1850 | 2170 |
| | ITS (kPa)) | 310 | 425.8 |
| | Rutting @ 30° C. (mm) | 1.8 | 4 |

The use of the foamed sulfur asphalt appears to have reduced rutting of the marl and sahkma soil samples by more than 50% compared to the use of the foamed neat asphalt. Although not wanting to be bound by theory, it is believed that the rutting resistance of dune sand may be increased by mixing sand with other types of aggregates.

The marl foamed sulfur asphalt stabilized soil appears to be the most preferable stabilized soil composition of the six shown. For this composition, the Marshall stability is greater than 6.672 kN (30), the Indirect Tensile Strength is greater than 200 kPa (640), and has a Durability of greater than 70% (72). This satisfies several minimum daily use requirements for an asphalt concrete.

What is claimed is:

1. A method of manufacturing a foamed sulfur asphalt stabilized soil comprising the steps of:
   introducing an asphalt binder, elemental sulfur, foaming air, and foaming water into a foaming mixer, where the foaming water has a water introduction pressure, where the foaming air has an air introduction pressure, and where the water introduction pressure is greater than the air introduction pressure;
   operating the foaming mixer such that a foamed sulfur asphalt forms with a water content of about 3.45%, where the foamed sulfur asphalt has a foam half-life equal to or greater than about 6 seconds and has a foam expansion ratio equal to or greater than 8, and where the foaming mixer operates at a temperature of about 150° C.;
   introducing the foamed sulfur asphalt, an aggregate having a moisture content, and Portland cement into an aggregate mixer; and
   operating the aggregate mixer such that the foamed sulfur asphalt stabilized soil forms.

2. The method of claim 1 where an amount of Portland cement introduced into the aggregate mixer is in a range of from about 0.1 wt. % to about 2 wt. % of the weight of the aggregate on an air-dried basis.

3. The method of claim 1 where the moisture content of the introduced aggregate is about the optimum moisture content for compaction of the aggregate.

4. The method of claim 1 further comprising the step of introducing moisturizing water to the introduced aggregate such that the combination of the moisturizing water and the introduced aggregate forms an aggregate having a moisture content of about the optimum moisture content for compaction of the aggregate, where the moisture content of the introduced aggregate in weight percent of the aggregate as air-dried aggregate is in a range of from about the moisture content of air-dried aggregate to less than about the optimum moisture content for compaction of the aggregate.

5. The method of claim 1 further comprising the step of introducing moisturizing water to the introduced aggregate such that the combination of the moisturizing water and the introduced aggregate forms an aggregate having a moisture content of about $0.5(W_{OMC})+1$, where $W_{OMC}$ is a determined optimum moisture content for introduced aggregate in weight percent and where the moisture content of the introduced aggregate in weight percent of the aggregate as air-dried aggregate is in a range of from about the moisture content of air-dried aggregate to less than about the optimum moisture content for compaction of the aggregate.

6. The method of claim 1 where an amount of foamed sulfur asphalt introduced into the aggregate mixer is in a range of from about 5 wt. % to about 10 wt. % of the foamed sulfur asphalt stabilized soil.

7. A foamed sulfur asphalt stabilized soil comprising foamed sulfur asphalt water content of about 3.45% when produced at a temperature of about 150° C., an aggregate having a moisture content, and Portland cement, where the foamed sulfur asphalt has a foam half-life equal to or greater than about 6 seconds and has a foam expansion ratio equal to or greater than 8.

8. The foamed sulfur asphalt stabilized soil of claim 7 having a Marshall stability greater than about 6.672 kNs.

9. The foamed sulfur asphalt stabilized soil of claim 7 having an Indirect Tensile Strength greater than 200 kPa.

10. The foamed sulfur asphalt stabilized soil of claim 7 having a Durability greater than 70%.

11. The foamed sulfur asphalt stabilized soil of claim 7 where the aggregate is selected from the group consisting of dune sand, marl soil, sabkha soil, roads aggregate base, roads aggregate subbase, reclaimed asphalt pavement mix and combinations thereof.

12. A method of manufacturing a foamed sulfur asphalt comprising the steps of:
   introducing an asphalt binder, elemental sulfur, foaming air, and foaming water into a foaming mixer, where the foaming water has a water introduction pressure, where the foaming air has an air introduction pressure, and where the water introduction pressure is greater than the air introduction pressure; and
   operating the foaming mixer such that a foamed sulfur asphalt forms with a water content of about 3.45%, where the foamed sulfur asphalt has a foam half-life equal to or greater than about 6 seconds and has a foam expansion ratio equal to or greater than 8, and where the foaming mixer operates at a temperature of about 150° C.

13. The method of claim 12 where the introduced asphalt binder is a Performance Grade asphalt binder.

14. The method of claim 12 where the asphalt binder and the elemental sulfur are introduced as a sulfur asphalt binder.

15. The method of claim 12 where the sulfur asphalt binder has an elemental sulfur content in a range of from about 10 wt. % to about 50 wt. % of the sulfur asphalt binder.

16. The method of claim 12 further comprising the steps of introducing the asphalt binder and elemental sulfur into a pre-mixer such that the sulfur asphalt binder forms, and then introducing the sulfur asphalt binder into the foaming mixer in place of both the asphalt binder and elemental sulfur.

17. The method of claim 12 where the elemental sulfur is introduced into the foaming mixer as a molten liquid.

18. A foamed sulfur asphalt comprising an asphalt binder, elemental sulfur, foaming air, and foaming water, where the foamed sulfur asphalt has a water content of about 3.45% when produced at a temperature of about 150° C., a foam half-life equal to or greater than about 6 seconds, has a foam expansion ratio equal to or greater than 8, and has an amount of elemental sulfur in a range of from about 10% to about 50% by weight of the combined amount of elemental sulfur and the asphalt binder in the foamed sulfur asphalt.

19. The foamed sulfur asphalt of claim 18 where the asphalt binder is a PG 64-10 asphalt binder.

20. The foamed sulfur asphalt of claim 18 where the foamed sulfur asphalt has a foam half-life of about 9.1 seconds and has a foam expansion ratio of about 8.8.

* * * * *